(12) United States Patent
Bertele

(10) Patent No.: US 7,804,282 B2
(45) Date of Patent: Sep. 28, 2010

(54) BUCK CONVERTER WITH INDUCTOR PRE-ENERGIZING

(75) Inventor: Martin Bertele, München (DE)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 438 days.

(21) Appl. No.: 11/605,091

(22) Filed: Nov. 28, 2006

(65) Prior Publication Data

US 2008/0136387 A1 Jun. 12, 2008

(30) Foreign Application Priority Data

Nov. 21, 2006 (EP) .................................. 06392016

(51) Int. Cl.
*G05F 1/00* (2006.01)
(52) U.S. Cl. ..................... 323/222; 323/271; 323/282
(58) Field of Classification Search ................ 323/282, 323/271, 222, 228, 272, 284
See application file for complete search history.

(56) References Cited

U.S. PATENT DOCUMENTS

| | | | |
|---|---|---|---|
| 5,999,419 | A | 12/1999 | Marrero |
| 6,037,755 | A | 3/2000 | Mao et al. |
| 6,087,816 | A | 7/2000 | Volk |
| 6,166,527 | A | 12/2000 | Dwelley et al. |
| 6,404,172 | B1 | 6/2002 | May |
| 6,650,095 | B2 | 11/2003 | Aiello et al. |
| 7,154,250 | B2 * | 12/2006 | Vinciarelli .................. 323/240 |
| 7,265,524 | B2 * | 9/2007 | Jordan et al. ................ 323/225 |
| 2005/0093526 | A1 | 5/2005 | Notman |
| 2006/0055384 | A1 * | 3/2006 | Jordan et al. ................ 323/282 |
| 2006/0176038 | A1 * | 8/2006 | Flatness et al. ............. 323/282 |
| 2008/0001587 | A1 * | 1/2008 | Cremoux .................... 323/282 |
| 2008/0252276 | A1 * | 10/2008 | Omet et al. ................. 323/282 |

FOREIGN PATENT DOCUMENTS

| | | |
|---|---|---|
| EP | 1 361 649 A1 | 11/2003 |
| WO | WO 00/67366 | 11/2000 |
| WO | WO 01/13502 A1 | 2/2001 |
| WO | WO2006046220 A1 * | 5/2006 |

OTHER PUBLICATIONS

"A High Efficiency, Non-Inverting, Back-Boost DC-DC Converter", by Mark Gaboriault et al., Applied Power Elec. Conf. & Expo., 2004, APEC '04, Ninteenth Annual IEEE, Feb. 22-26, 2004, pp. 1411-1415.

* cited by examiner

*Primary Examiner*—Bao Q Vu
*Assistant Examiner*—Nguyen Tran
(74) *Attorney, Agent, or Firm*—Saile Ackerman LLC; Stephen B. Ackerman

(57) ABSTRACT

Circuits and methods to achieve a buck-boost converter, capable to achieve a constant output voltage by pre-charging of an inductor if the input voltage is close to the output voltage has been achieved. The prior art problem of output voltage variations occurring while the input voltage is close to the output voltage is avoided. In case the input voltage is lower than a defined threshold voltage or the duty cycle exceeds a defined maximum allowable level, the inductor of the converter is pre-charged followed by boosting of the energy of the inductor to the output of the converter. In both modes the control loops of the buck converter can be used for buck duty cycle control. The duration of the pre-charge depends upon the level of the input voltage, the lower the input level is the longer is the pre-charge performed.

14 Claims, 6 Drawing Sheets

Boost mode phase I/ "inductor pre-energize"

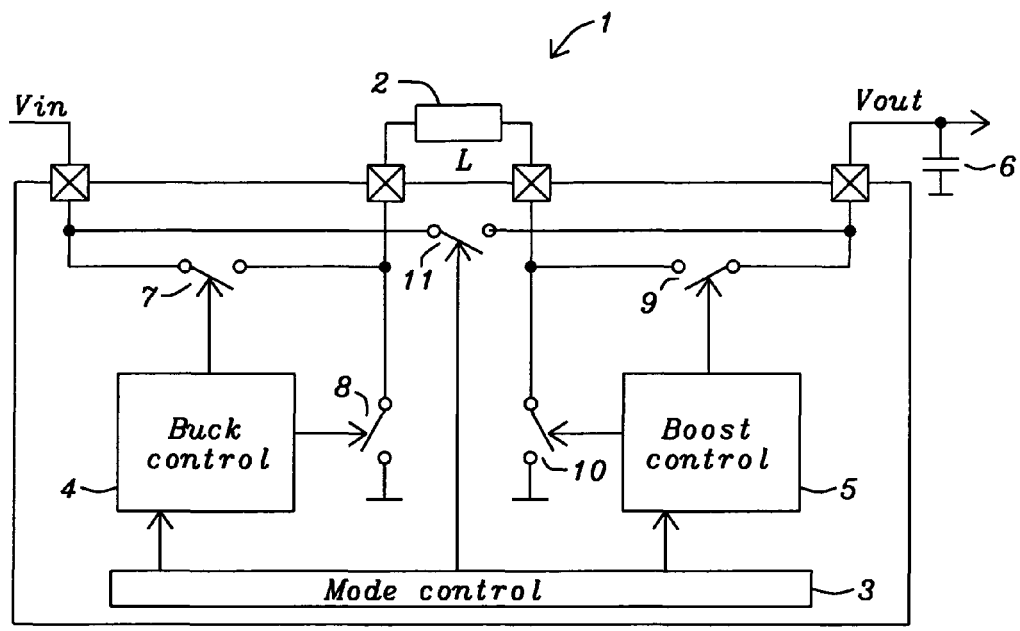
FIG. 1a – Prior Art
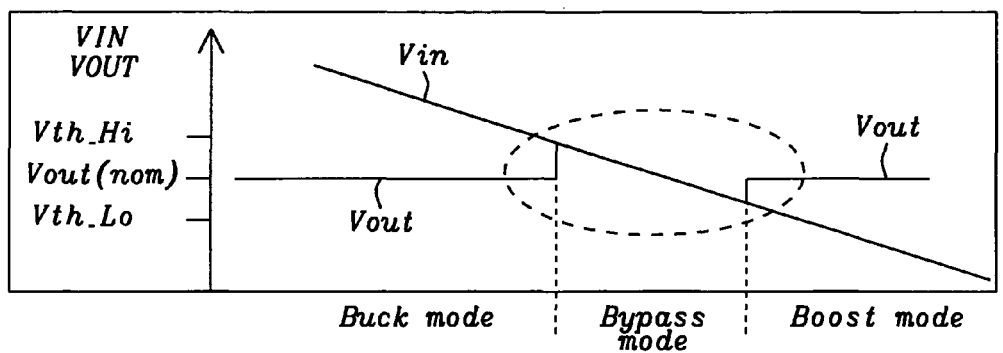
FIG. 1b – Prior Art

BUCK CONVERTER WITH INDUCTOR PRE-ENERGIZING

BACKGROUND OF THE INVENTION (1) Field of the Invention

This invention relates generally to DC-DC switch mode voltage converters and relates more specifically to a buck-boost voltage converter having a constant output voltage.

(2) Description of the Prior Art

DC-to-DC converters are important in portable electronic devices such as cellular phones and laptop computers, which are supplied with power from batteries. Such electronic devices often contain several sub-circuits which each require unique voltage levels different from those supplied by the battery (sometimes higher or lower than the battery voltage, or even negative voltage). Additionally, the battery voltage declines as its stored power is drained. DC-to-DC converters offer a method of generating multiple controlled voltages from a single variable battery voltage, thereby saving space instead of using multiple batteries to supply different parts of the device.

Electronic switch-mode DC-to-DC converters are available to convert one DC voltage level to another. These circuits, very similar to a switched-mode power supply, generally perform the conversion by applying a DC voltage across an inductor or transformer for a period of time (usually in the 100 kHz to 5 MHz range) which causes current to flow through it and store energy magnetically, then switching this voltage off and causing the stored energy to be transferred to the voltage output in a controlled manner. By adjusting the ratio of on/off time, the output voltage can be regulated even as the current demand changes. This conversion method is more power efficient (often 80% to 95%) than linear voltage conversion, which must dissipate, unwanted power. This efficiency is beneficial to increasing the running time of battery-operated devices.

A buck-boost converter is a type of DC-DC converter that has an output voltage magnitude that is either greater than or less than the input voltage magnitude. It is a switch mode power supply with a similar circuit topology to the boost converter and the buck converter. The output voltage is adjustable based on the duty cycle of the switching transistor. Using a buck-boost converter is especially advantageous with applications wherein a battery provides a voltage, which can be either higher or over time lower than the voltage level required by a load.

Some implementations of buck-boost converters switch between two or three modes when the input voltage changes. With falling input voltage the buck duty cycle rises until the maximum is reached. The buck converter might go into a bypass mode wherein the input and the output are shortened or continues to operate with maximum duty cycle.

FIG. 1$a$ prior art shows the architecture of a prior art buck-boost converter 1. A mode-control block 3 controls, depending upon the level of input voltage Vin, if the converter is operated in buck-mode, in boost mode, or in bypass mode. The mode-control block 3 can shorten the input voltage to the output voltage in the bypass mode via bypass switch 11. The buck-mode is controlled by a buck control block 4, the boost mode is controlled by a boost control block 5. The buck control is performed via buck high-side switch 7 and buck low-side switch 8. The boost control is performed via boost high-side switch 9 and boost low-side switch 10. During a duty cycle the input DC voltage Vin is applied across an inductor L2. Electronic noise of the output voltage Vout, caused by switching at high frequencies, is filtered by capacitor 6.

FIG. 1$b$ prior art shows the output voltage Vout dependent upon the input voltage Vin. In prior art no constant output voltage can be obtained by a buck-boost converter when the input voltage is close to the output voltage, i.e. between a high voltage threshold Vth_hi and a low voltage threshold Vth_low. Both threshold voltages are close to the output voltage desired. During this "interim phase" the buck-boost converter might either go into a bypass mode, wherein the input and the output are shortened, or continue to operate in the buck mode at maximum duty cycle. In both cases no constant output voltage is obtained. As shown in FIG. 1$b$ prior art the output voltage increases first and drops then. The boost-mode will be finally enabled with further dropping of the input voltage.

It is a challenge to the designer of buck-boost converters to achieve converters providing a constant output voltage even during the interim phase.

There are more known patents or patent publications dealing with the design of buck-boost converters.

U.S. patent (U.S. Pat. No. 5,999,419 to Marrero) proposes a non-isolated boost converter with input and output current steering. The input current steering is connected across the input switching transistor, is magnetically coupled to the input inductor and conducts the input current when the switch is turned off, thereby reducing ripple in the input current. The output current steering is connected across the diode in the low-pass output filter and is magnetically coupled to the input inductor to generate an induced current for the output filter when the switch is turned on, thereby preventing the output current from pulsating. With the output filter connected across the switch, a boost converter is formed with the output dc voltage being greater than the input dc voltage in relation to the switching duty cycle. With the output filter connected across the input inductor, a buck-boost converter is formed with the output dc voltage being greater than or less than the input dc voltage in relation to the switching duty cycle.

U.S. patent (U.S. Pat. No. 6,650,095 to Aiello et al.) discloses a converter using the energy stored in the output filter of a step-down (or buck) converter and in the inductor of a step up/down (or buck-boost) converter to supply a second output of opposite sign. In particular, the converter has a first input receiving an input voltage; a first output supplying a first output voltage of a first sign; a second output supplying a second output voltage of opposite sign; a controlled switch connected between the first input and a first intermediate node; an inductor connected between the first intermediate node and the first output; a diode connected between the first intermediate node and a second intermediate node; and a dual voltage generating circuit connected between the second intermediate node and the second output.

U.S. patent (U.S. Pat. No. 6,404,172 to May) discloses a method and apparatus for integrating buck or boost converting including processing for controlling the configuration of transistors, an inductor, a power source, and a load to provide buck or boost converting. Such processing begins by determining whether a buck/boost signal is indicating buck operation or boost operation. If the buck/boost signal is indicating buck operation, the processing proceeds by generating a buck control signal and a load control signal. The buck control signal is provided to the transistors such that the transistors are coupled to a power source and the inductor to provide a buck converter. The load control signal is provided to a load transistor to regulate the output with respect to the load. When the buck-boost signal indicates boost operation, the processing generates a boost control signal and a load control signal.

The boost control signal is provided to the transistors such that the transistors are coupled to the power source and the inductor to provide a boost converter. The load control signal is provided to the load transistor to regulate the output of the external load.

SUMMARY OF THE INVENTION

A principal object of the present invention is to achieve methods and circuits to avoid output voltage variations of buck-boost converters while the input voltage is close to the output voltage.

A further object of the present invention is to avoid problems caused by a high duty cycle in the buck mode of buck-boost converters.

A further object of the present invention is to avoid problems caused by a low duty cycle in the boost mode of buck-boost converters.

Another object of the present invention is to achieve a simple control circuitry of a buck-boost converter.

In accordance with the objects of this invention a method to achieve a constant output voltage with a buck-boost converter has been invented. The method comprises, first, (1) providing a buck-boost converter, converting a DC input voltage to a DC output voltage, comprising a mode control block, a buck control block, an inductor, a precharge-boost control block, and an output capacitor. The following steps of the method comprise (2) checking, if the input voltage is significantly higher than the output voltage required, if positive go to step 3 else go to step 5, (3) performing buck control of said inductor to convert input voltage down to output voltage, and (4) to go to step 2. Further steps of the method comprise (5) pre-charging of the inductor dependent upon the level of input voltage during a first phase of buck period, 6) transferring energy from inductor to output during the rest of buck period, and (7) to go to step (2)

In accordance with the objects of this invention a buck-boost converter, capable to achieve a constant output voltage by pre-charging of an inductor if the input voltage is close to the output voltage required, has been achieved. The converter comprises, first, a mode control block defining the mode the buck-boost converter is operated, wherein said mode control block is connected to a buck control block and to a precharge-boost control block, said buck control block, controlling with a first and a second switch a charging of an inductor, wherein said first switch has a first terminal connected to an input voltage and a second terminal is connected to a first terminal of said inductor and to a first terminal of said second switch, and wherein a second terminal of said second switch is connected to ground. Furthermore the buck-boost converter comprises said precharge-boost control block controlling with a first and a second switch a pre-charging of an inductor and an energy transfer from the inductor to the output of the converter, wherein said first switch has a first terminal connected to an output voltage and a second terminal is connected to a second terminal of said inductor and to a first terminal of said second switch, and wherein a second terminal of said second switch is connected to ground, and said inductor.

BRIEF DESCRIPTION OF THE DRAWINGS

In the accompanying drawings forming a material part of this description, there is shown:

FIG. 1a prior art shows the major components of a buck-boost converter.

FIG. 1b prior art illustrates variations of output voltage of a buck boost converter if the input voltage level is close to the output voltage level

DESCRIPTION OF THE PREFERRED EMBODIMENTS

The preferred embodiments disclose methods and circuits for a buck-boost converter capable to achieve an output voltage being constant over all operation modes. The present invention especially solves the problem of output voltage variations if the input voltage is very close to the output voltage.

An important feature of the present invention is the pre-energization or pre-charging of the inductor of the buck-boost converter for a fixed part of the buck period in case the input voltage falls below a certain threshold or the buck duty cycle exceeds a maximum allowable level. After the pre-energization the normal buck control is exercised for the rest of the period.

Figure 2:
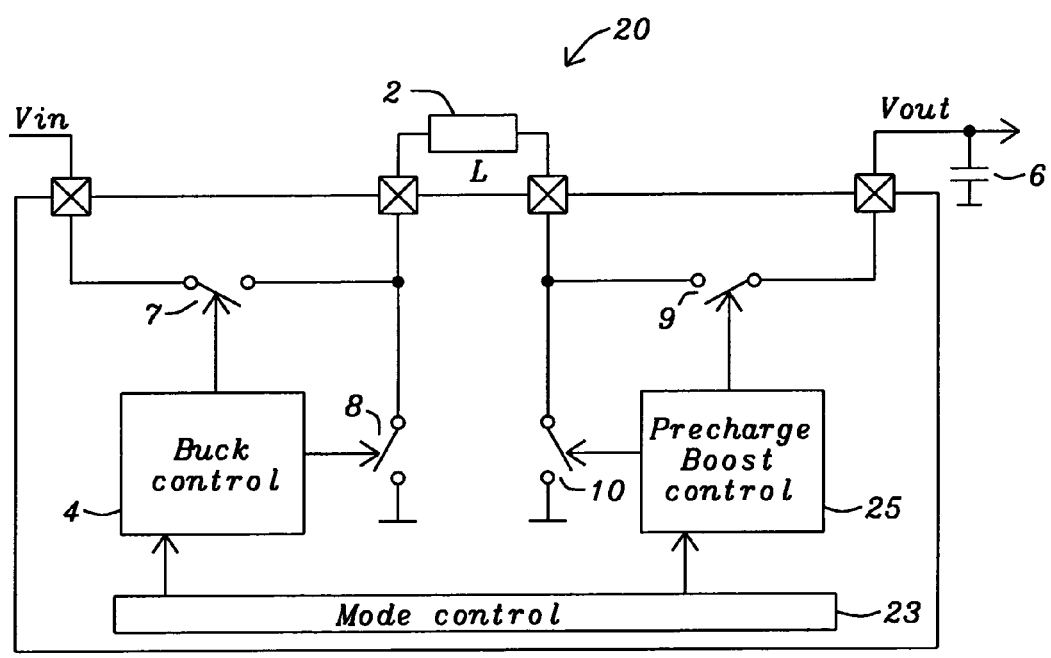
FIG. 2 shows the major components of an embodiment of the buck-boost converter invented

FIG. 2 shows a schematic illustration of a preferred embodiment of the present invention. A mode-control block 23 controls, depending upon the input voltage Vin, if the converter is operated in buck-mode or in a precharge mode followed by a buck mode, in which the energy stored in the inductor L2 during the pre-charge phase is transferred to the output of the converter.

The mode-control block 23 initiates a pre-energization or pre-charge of the inductor 2 during a certain part of the buck period if the input voltage falls below a threshold voltage which is a bit higher than the output voltage desired. Alternatively the pre-energization starts if the buck duty level exceeds a certain level. This pre-charging time might be increased step by step if the input voltage falls below further thresholds, or the buck duty cycle exceeds further levels. The buck-mode is controlled by a buck control block 4, the pre-charging of inductor 2 and the following boosting to the output is controlled by a "precharge-boost control" block 25.

The buck control is performed via buck high-side switch 7 and buck low-side switch 8. The pre-charging is performed via high-side switch 9 and low-side switch 10. During a buck duty cycle the input DC voltage Vin–Vout is applied across an inductor L2. Electrongic noise of the output voltage Vout, caused by switching at high frequencies, is filtered by capacitor 6.

Figure 3A:
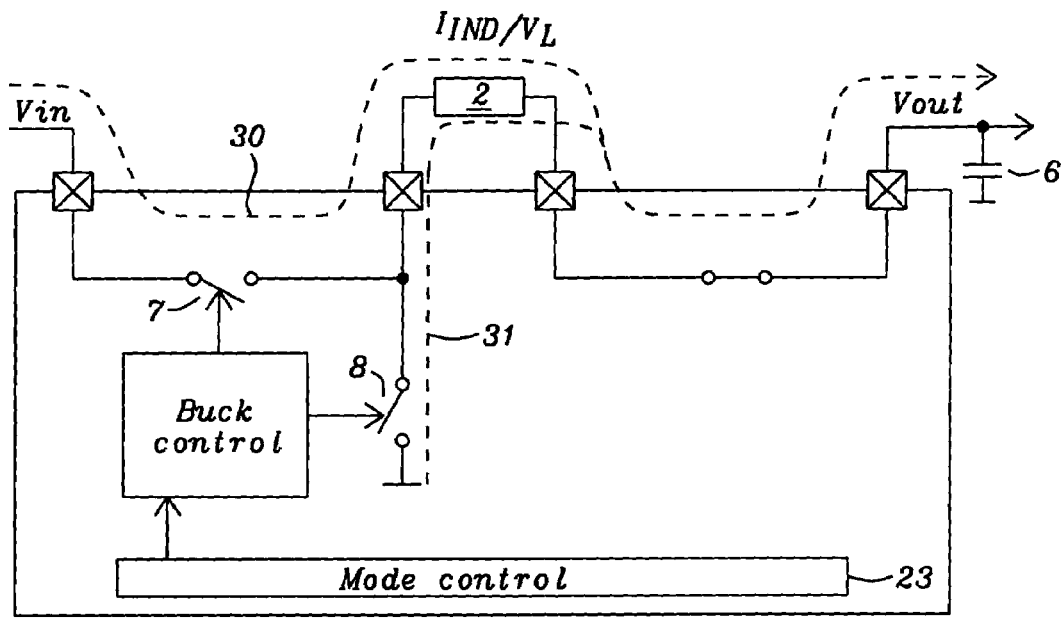
FIG. 3a illustrates the flow of energy in the buck mode.
Figure 3B:
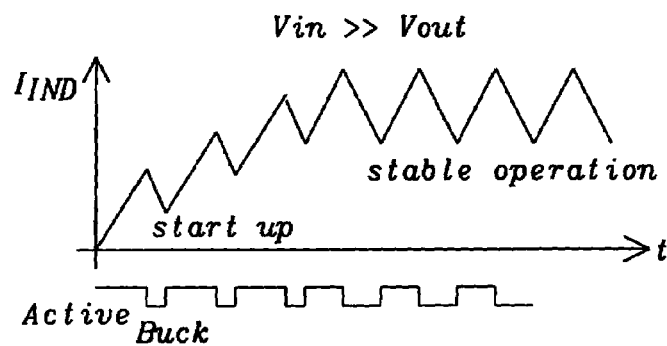
FIG. 3b illustrates the start up and stable operation of the converter during a phase wherein the input voltage Vin is significantly higher than the output voltage Vout.

FIGS. 3a and 3b illustrate the buck mode during a phase wherein the input voltage Vin is significantly higher than the output voltage Vout. FIG. 3b shows the current Iind through inductor 2 during start up and during a stable operation phase. In a preferred embodiment a coil is used as inductor. When switch 7 is closed the voltage VL across the inductor 2 equals VL=Vin–Vout. The current through the inductor rises linearly as long switch 7 is closed. As switch 8 is open during this phase, no current flows to ground. When switch 7 is opened, switch 8 is closed at the same time. The voltage across the inductor is then VL=−Vout. The current lind decreases. The dotted line 30 shows the flow of energy while switch 7 is closed and the dotted line 31 shows the flow of energy while switch 8 is closed.

FIG. 3b further illustrates at its bottom the correspondent action of the buck control in a phase wherein the input voltage is significantly higher than the output voltage. Activebuck ON means that switch 7 is closed and switch 8 is open. The current lind increases during this phase. Activebuck OFF means that switch 7 is open and switch 8 is closed. The current lind decreases during this phase.

Figure 4A:
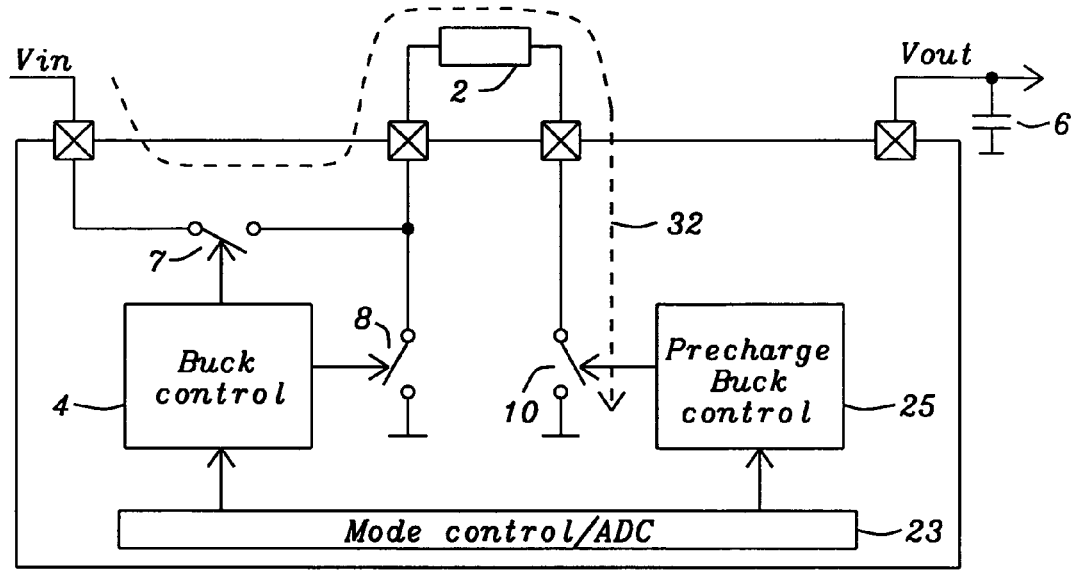
FIG. 4a shows the energy flow of boost mode phase 1 characterized by precharge of the inductor by a current from the input voltage Vin to ground.
Figure 4B:
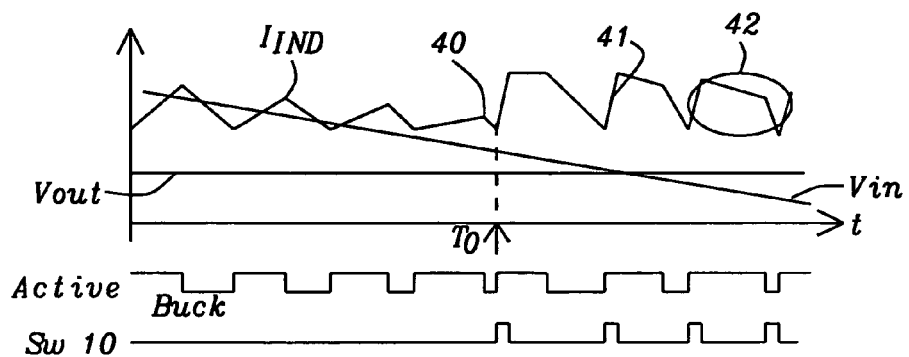
FIG. 4b shows time-charts of the input voltage Vin, the output voltage Vout, and the inductor current Iind

FIG. 4b shows time-charts of the input voltage Vin, the output voltage Vout, and the inductor current lind. The input voltage Vin is decreasing over time until Vin is smaller than the constant output voltage Vout. Furthermore FIG. 4b shows a time chart of the current lind through inductor 2. At the point of time T0 the input voltage Vin has approached the output voltage Vout enough to reach a first threshold voltage, or the maximum duty cycle of the buck control has been reached. This means minimum off time of buck switch 7 is reached. Numeral 40 signifies this event in the time chart of the current lind through inductor 2. Numeral 41 signifies the pre-energization in the time chart of the current lind. The duty cycle Activebuck is shown at the bottom of FIG. 4b.

FIG. 4a shows the boost mode phase 1 characterized by precharge of the inductor 2 by a current from the input voltage Vin to ground. During this phase 1 starting at point of time T0, as shown in FIG. 4b, is the output of the converter disconnected from the inductor 2. The high-side switch 7 of the buck control and the low-side switch 10 of the "precharge boost control" block are closed and the high side switch 9 (switch not shown in FIG. 4a, but shown in FIG. 4c) of the "precharge boost control" block is open during this phase 1. The output voltage is provided by capacitor 6 during this phase 1.

Furthermore at the bottom of FIG. 4b the operation of switch 10, providing energy to inductor 2 during boost mode phase 1, is shown. In order to precharge inductor 2 switches 7 and 10 are closed at point of time T0 and a current flows from the input through the inductor to ground. The dotted line 32 shows the flow of energy during this phase 1.

Figure 4C:
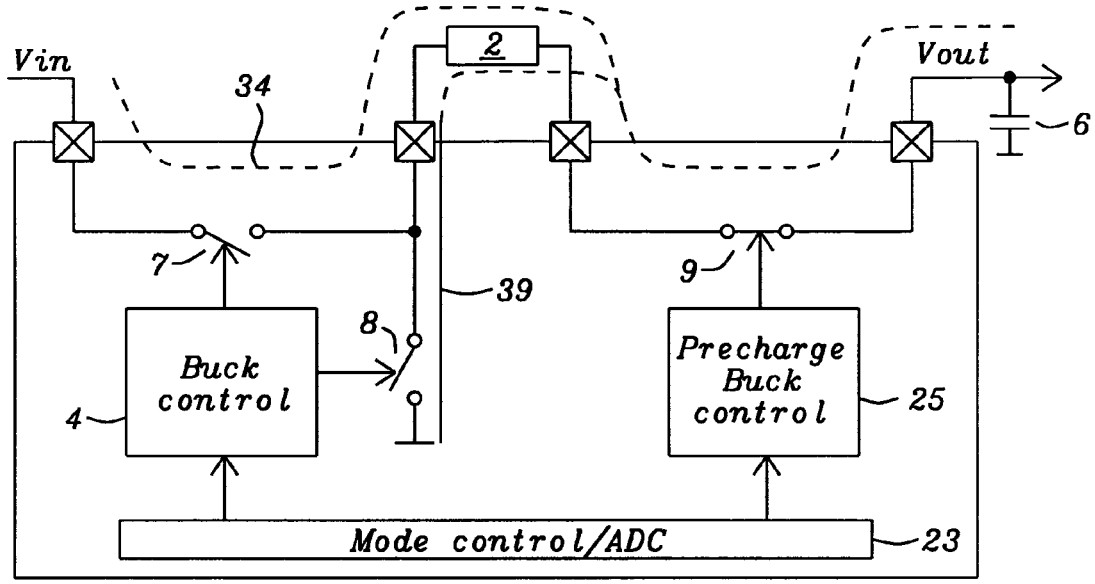
FIG. 4c shows the boost mode phase 1 characterized by precharge of the inductor by a current from the input voltage Vin to ground.

The dotted lines 34 and 35 of FIG. 4c show the flow of energy during boost mode phase 2. This phase 2 is characterized by a closed high switch 9 of the "precharge boost" controller, the energy pre-charged in the inductor 2 during phase 1 allows a boost mode, the energy stored in the inductor 2 is transferred to the output. In phase 2 the buck-boost converter works as a standard buck converter, the energy flow shown in FIG. 4c corresponds to the energy flow of the buck mode shown in FIG. 3a.

Figure 4D:
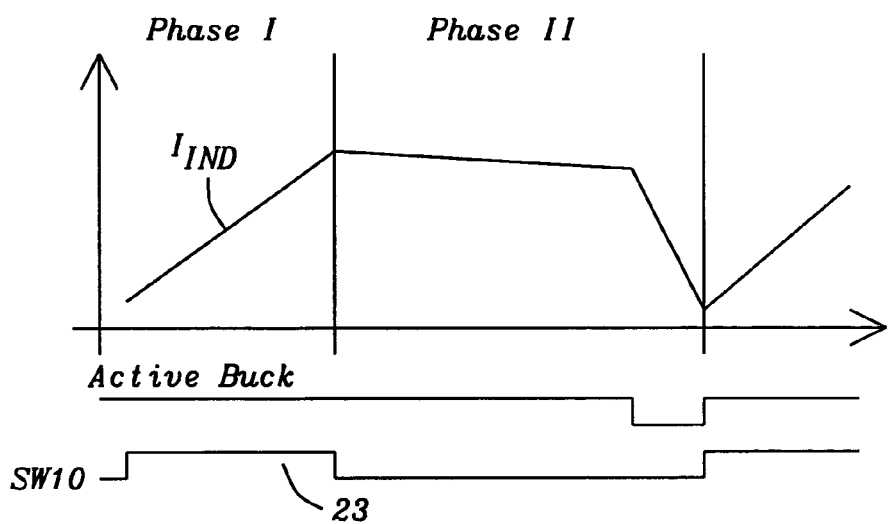
FIG. 4d shows detailed time-charts of the inductor current Iind, a precharge switch and active buck switch.

FIG. 4d shows in more detail boost mode phases 1 and 2 as enlargement of the time span shown in the ellipsoid 42 of FIG. 4b. In phase 1, which covers the pre-charge of the inductor 2, buck high-switch 7 is ON (closed) and the "precharge-boost" low-switch 10 is ON the current lind through the inductor 2 increases. Numeral 43 signifies a fixed pulse width of switch 10 during phase 1.

In phase 2 the "precharge-boost" low switch 10 is opened, the "precharge-boost" high switch 9 is closed and the energy from the inductor 2 is flowing to the output of the buck-boost converter. In that moment the buck control block takes over the control of the switches 7 and 8. It opens switch 7 and closes switch 8 after a Duty Cycle of the Activebuck such that the average coil current is equal to the output current and the output voltage is kept constant. The Duty cycle control is done as it is general practice for buck converters (preferably using a compensation ramp and a current feed-back of lind as well as a voltage feedback of Vout) as shown already in FIG. 4c.

It has to be understood that the duration of phase 1 depends on the level of the input voltage Vin. More pre-charging is required if the input voltage Vin continues to decrease and a longer precharge-phase 1 is therefore required.

The mode control block is also monitoring the input voltage in order to define the precharge time or the buck duty cycle accordingly. This monitoring can be performed by an analog-to-digital (ADC) converter. In a simple configuration it only switches on and off the boost mode, in a more complex configuration the length of the boost pulse can have more discrete levels depending of the Vin level. A switching hysteresis could be used for a better stabilization of the buck-boost converter.

As mentioned above alternatively the duty-cycle can be monitored instead of the level of the input voltage Vin for switching to the boost mode and back.

In a preferred embodiment of the invention all components except the inductor 2 and the output capacitor 6 are integrated in an IC. As the development of integrated capacitors and integrated inductors progresses it would be possible to integrate the inductor and capacitor of the buck-boost converter in an IC as well.

Figure 5:
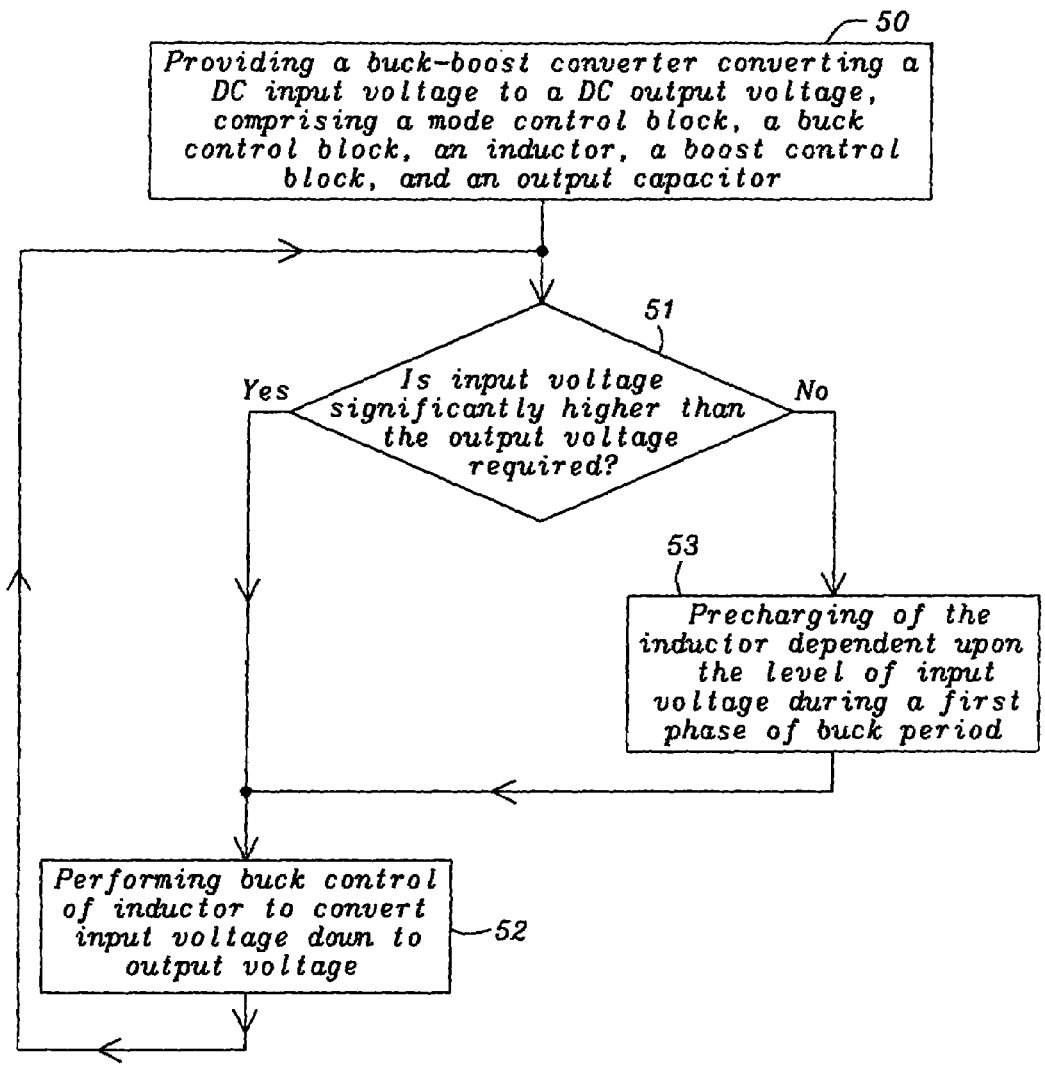
FIG. 5 shows a flowchart of a method to achieve a constant output voltage with a buck-boost converter

FIG. 5 illustrates a flowchart of a method to achieve a constant output voltage with a buck-boost converter. Step 50 illustrates the provision of a buck-boost converter, converting a DC input voltage to a DC output voltage, comprising a mode control block, a buck control block, an inductor, a precharge-boost control block, and an output capacitor. In step 51 is a check if the input voltage is significantly higher than the output voltage required. As outlined above this could be either detected by comparing the input voltage with a voltage threshold, which is slightly above the output voltage required, or by comparing the actual buck duty cycle with a maximum allowable buck duty cycle. The process flow continues with step 52 if the input voltage level is significantly higher than the output voltage. Step 52 illustrates buck control of the inductor to convert input voltage down to output voltage required and then the process flow goes back to step 51. After step 51 the process flow goes to step 53 if the input voltage level is not significantly higher than the output voltage. Step 53 illustrates precharging of the inductor dependent upon the input voltage level during a first phase of the buck period, followed by step 52 wherein energy is transferred from inductor to the output of the buck-boost converter during the rest of the buck period, i.e. performing buck control. It has to be noted that the control of the pre-charging can be very simple; no feedback loop is required for this control. A hysteresis for the control might be useful to achieve more stability. The process flow goes then back to step 51.

The advantages of the buck-boost converter invented are:
1. solves the problem of output voltage variations when the input voltage is close to the output voltage.
2. solves problems caused by high duty cycle in buck mode.
3. solves problems caused by low duty cycles in boost mode problems.
4. enables a simple control by avoiding a control loop for the boost converter.

While the invention has been particularly shown and described with reference to the preferred embodiments thereof, it will be understood by those skilled in the art that various changes in form and details may be made without departing from the spirit and scope of the invention.

What is claimed is:

1. A method to achieve a constant output voltage with a buck-boost converter is comprising:
   (1) providing a buck-boost converter, converting a DC input voltage to a DC output voltage, comprising a mode control block, a buck control block, an inductor, a pre-charge-boost control block, and an output capacitor;
   (2) checking, if the input voltage is significantly higher than the output voltage required, if positive go to step 3 else go to step 5;
   (3) performing buck control of said inductor to convert input voltage down to output voltage;
   (4) go to step 2;
   (5) pre-charging of the inductor during a part of a buck period which is dependent upon the level of input voltage during a first phase of buck period, wherein a monitoring of the input voltage is performed by an analog-to-digital converter and a length of a pre-charge pulse is generated in discrete steps; and
   (6) go to step (3).

2. The method of claim 1 wherein a comparison of the input voltage level with a threshold voltage, which is higher than the output voltage, is used to determine the condition if the input voltage is significantly higher than the output voltage.

3. The method of claim 1 wherein a comparison of the buck duty cycle with a duty cycle threshold is used to determine the condition if the input voltage is significantly higher than the output voltage.

4. The method of claim 1 wherein a comparison of the buck duty cycles with a duty cycle threshold is used to determine the duration of the pre-charge of the inductor.

5. The method of claim 1 wherein a comparison of the input voltage level with a threshold voltage is used to determine the duration of the pre-charge of the inductor.

6. The method of claim 1 wherein said buck control is performed in a way that an average current through said inductor is equal to the output current.

7. The method of claim 1 wherein said mode control block monitors the input voltage in order to switch on and off accordingly said pre-charging of the inductor.

8. The method of claim 1 wherein a switching hysteresis is used to control the duration of the pre-charging.

9. A buck-boost converter, providing a constant output voltage by pre-charging of an inductor if an input voltage is close to the output voltage required, is comprising:

a mode control block comprising an analog-to-digital (ADC) converter controlling a length of boost pulses in multiple discrete levels depending on the input voltage level, defining the mode the buck-boost converter is operated, comprising initiating, if the input voltage falls below a threshold voltage, which is higher than the output voltage, a pre-charging of the inductor followed by a continuation of a buck operation, wherein said mode control block is connected to a buck control block and to a precharge-boost control block;

said buck control block controlling with a first and a second switch a charging of an inductor, wherein said first switch has a first terminal connected to an input voltage and a second terminal is connected to a first terminal of said inductor and to a first terminal of said second switch, and wherein a second terminal of said second switch is connected to ground;

said precharge-boost control block controlling with a third and a fourth switch a pre-charging of said inductor during a part of a buck period and an energy transfer from said inductor to the output of the converter, wherein said third switch has a first terminal connected to an output voltage and a second terminal is connected to a second terminal of said inductor and to a first terminal of said fourth switch, and wherein a second terminal of said fourth switch is connected to ground; and said inductor.

10. The buck-boost converter of claim 9 wherein said pre-charging is started if the buck duty cycle exceeds a defined maximum level.

11. The buck-boost converter of claim 9 wherein capacitor is connected between output and ground.

12. The buck-boost converter of claim 9 wherein said modes the buck-boost converter are operated are either a buck mode or a buck mode starting with a pre-charging phase.

13. The buck-boost converter of claim 9 wherein a coil is used for said inductor.

14. The buck-boost converter of claim 9 wherein a comparison of the buck duty cycle with a duty cycle threshold is used to determine the condition if the input voltage is significantly higher than the output voltage.

* * * * *